United States Patent
Vidal Ortiz et al.

(10) Patent No.: US 12,025,181 B2
(45) Date of Patent: Jul. 2, 2024

(54) AXIAL BEARING ASSEMBLY WITH CAGE TO ACCOMMODATE RADIAL MISALIGNMENT CONDITION

(71) Applicant: Schaeffler Technologies AG & Co. KG, Herzogenaurach (DE)

(72) Inventors: Alicia Vidal Ortiz, Pueblo (MX); Elvis Leonardo Daniel Vazquez, Irapuato (MX); Javier Villagomez, Irapuato (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 178 days.

(21) Appl. No.: 17/844,903

(22) Filed: Jun. 21, 2022

(65) Prior Publication Data
US 2023/0407910 A1    Dec. 21, 2023

(51) Int. Cl.
| | |
|---|---|
| *F16C 19/36* | (2006.01) |
| *F16C 19/30* | (2006.01) |
| *F16C 33/46* | (2006.01) |
| *F16C 33/58* | (2006.01) |

(52) U.S. Cl.
CPC .......... *F16C 19/364* (2013.01); *F16C 19/305* (2013.01); *F16C 33/4605* (2013.01); *F16C 33/4635* (2013.01); *F16C 33/588* (2013.01)

(58) Field of Classification Search
CPC .... F16C 19/305; F16C 19/364; F16C 33/366; F16C 33/4605; F16C 33/4635; F16C 33/4676; F16C 33/546; F16C 33/56; F16C 33/588
See application file for complete search history.

(56) References Cited

U.S. PATENT DOCUMENTS

| | | | | |
|---|---|---|---|---|
| 3,839,531 A | * | 10/1974 | Parkinson | ........... F16C 33/3856 264/318 |
| 10,422,376 B2 | * | 9/2019 | Nakashima | ............. F16C 33/64 |
| 10,670,075 B2 | * | 6/2020 | Yamashita | ............ F16C 33/546 |

FOREIGN PATENT DOCUMENTS

| | | | | |
|---|---|---|---|---|
| DE | 102006004749 A1 | * | 8/2007 | .............. F16C 19/30 |
| DE | 102018115171 A1 | * | 1/2020 | |
| JP | 2009293398 A | * | 12/2009 | .............. F16C 19/46 |
| WO | WO-2016017629 A1 | * | 2/2016 | .............. F16C 19/10 |

* cited by examiner

*Primary Examiner* — Phillip A Johnson
(74) *Attorney, Agent, or Firm* — Volpe Koenig

(57) ABSTRACT

An axial bearing assembly is provided having a first washer forming a first raceway and including a radially inner retention flange, and a second washer forming a second raceway axially spaced apart from the first raceway, with the second washer including a radially outer retention flange. A cage including a radially inner rim, a radially outer rim, and a plurality of segments extending between the radially inner and outer rims defining a plurality of rolling element pockets is located between the first and second raceways. Rolling elements are located in at least some of the pockets. The radially outer rim of the cage includes a circumferentially extending groove on a radially outer surface. Outer retention tabs extend from the radially outer retention flange into the circumferentially extending groove.

17 Claims, 3 Drawing Sheets

AXIAL BEARING ASSEMBLY WITH CAGE TO ACCOMMODATE RADIAL MISALIGNMENT CONDITION

FIELD OF INVENTION

The present disclosure relates to an axial bearing assembly, and more particularly an axial bearing assembly with a bearing cage that allows for increased internal clearance for radial misalignment conditions.

BACKGROUND

Bearing assemblies are used in a wide range of applications. A goal in all bearing assemblies is to transmit loads with reduced friction over a long service life. For rotating rolling bearings, this also includes limiting any contact between fixed parts that are under load, which can cause premature wear, while also maintaining rolling elements sufficiently spaced apart so that uneven or eccentric loads are not created by improper spacing of the rolling elements, typically accomplished by a cage. It is also helpful to have the bearing components, such as inner and outer or axially spaced apart races, the rolling elements, and the cage held together.

For certain axial bearings, having the races arranged at an angle to the axis of the bearing to at least carry some radial loads, radial misalignment of the races can occur causing unwanted contact and wear.

It would be desirable to provide a bearing assembly that with improved reliability that is also inexpensive and easy to assemble.

SUMMARY

In one aspect, an axial bearing assembly is provided having a first washer forming a first raceway and including a radially inner retention flange, and a second washer forming a second raceway axially spaced apart from the first raceway, with the second washer including a radially outer retention flange. A cage including a radially inner rim, a radially outer rim, and a plurality of segments extending between the radially inner and outer rims defining a plurality of rolling element pockets is located between the first and second raceways. The radially outer rim of the cage includes a circumferentially extending groove on a radially outer surface. Rolling elements are located in at least some of the pockets. Outer retention tabs extend from the radially outer retention flange into the circumferentially extending groove. This forms a bearing assembly where the components are retained together while maintaining increased spacing between adjacent areas where the first and second washers are in close proximity to one another, particularly at an area of the inner diameter of the bearing.

In one embodiment, inner retention tabs are formed on the radially inner flange that extend to an opposite side of the cage from the first raceway. The inner and outer retention tabs retain the entire bearing together.

In one arrangement, the first raceway and the second raceway are normal to an axis of the bearing assembly. Alternatively, where some radial load(s) are also to be transmitted by the bearing assembly, the first raceway and the second raceway are frustoconical and extend, parallel to one another, at an acute angle to an axis of the bearing assembly. The cage is similarly frustoconical in form.

In one arrangement, the outer rim has a greater thickness in cross-section at a radially outer region than a thickness in a radially inner region. In an exemplary embodiment, the outer rim is tapered in cross-section.

In this embodiment, the circumferentially extending groove is located in the radially outer region in this area of increased thickness. This provides increased axial space to receive the circumferentially extending groove. The groove can also have a tapered form in cross-section, being wider at the radially outer surface.

In one arrangement, the cage is formed of a polymeric material, such as PA66, and can include a glass fill for increased strength. Preferably, the cage is moulded; however, it can be formed of other materials and by other methods, such as machining.

In one arrangement, there is a radial clearance space between a radially inner edge of the second washer and the radially inner retention flange on the first washer, and this radially inner clearance is greater than, and preferably at least two times the clearance, provided in known bearing assemblies of a similar size and capacity.

In one embodiment, each of the segments of the cage includes two opposite sides, with each of the sides facing an adjacent one of the rolling element pockets. The sides each include two surfaces that intersect in a medial region of the pocket, and the two surfaces are arranged at an angle of less than 180° relative to each other. This provides a simple way of retaining the rolling elements, which are preferably cylindrical rolling elements.

In another aspect, a bearing cage is provided that can be used for assembling a bearing. The bearing cage has a radially inner rim, a radially outer rim, and a plurality of segments extending between the radially inner and outer rims defining a plurality of rolling element pockets. The radially outer rim includes a circumferentially extending groove on a radially outer surface that is configured to receive outer retention tabs extending from a radially outer retention flange of a radially extending, raceway forming washer.

In one arrangement, the outer rim has a greater thickness in cross-section at a radially outer region than a thickness in a radially inner region.

In one arrangement, the outer rim is tapered in cross-section.

In one arrangement, the circumferentially extending groove is located in the radially outer region. The groove can also have a tapered form in cross-section, being wider at the radially outer surface.

The bearing cage is preferably formed of a polymeric material, such as PA66, and can be glass filled.

In one arrangement, each of the segments includes two opposite sides, each of the sides facing an adjacent one of the rolling element pockets. The sides each include two surfaces that intersect in a medial region of the pocket, and the two surfaces are arranged at an angle of less than 180° relative to each other.

Various ones of the disclosed features can be combined with one another in order to provide additional functionality. Additional embodiments are also disclosed herein.

BRIEF DESCRIPTION OF THE DRAWINGS

The foregoing Summary and the following Detailed Description will be better understood when read in conjunction with the appended drawings, which illustrate an exemplary embodiment of the disclosure. In the drawings.

DETAILED DESCRIPTION

Certain terminology is used in the following description for convenience only and is not limiting. "Axially" refers to a direction along an axis (X) of an assembly. "Radially" refers to a direction inward and outward from the axis (X) of the assembly. "Circumferentially" refers to a direction extending along a curve or circumference of a respective element relative to the axis (X) of the assembly. The terms "about" and "approximately" encompass + or −10% of an indicated value unless otherwise noted. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 1:
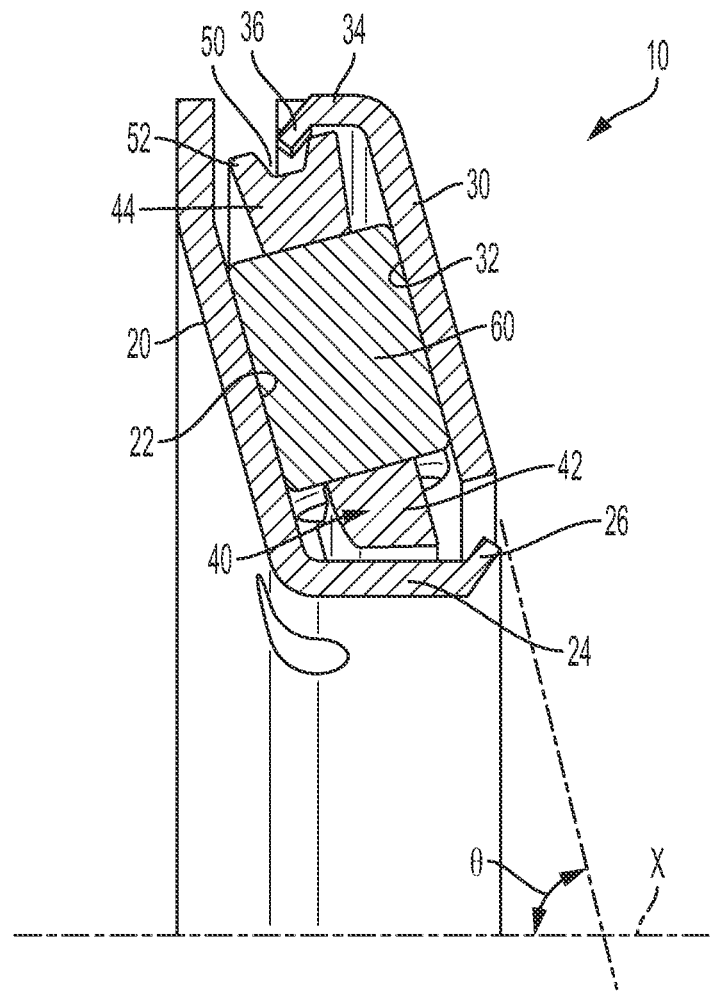
FIG. 1 is a cross-sectional view through an axial bearing assembly in accordance with one exemplary embodiment.

Referring to FIG. 1, an axial bearing assembly 10 in accordance with an exemplary embodiment is shown. The axial bearing assembly 10 includes a first washer 20 that forms a first raceway 22 and includes a radially inner retention flange 24. A second washer 30 is provided that forms a second raceway 32 that is axially spaced apart from the first raceway 22, and the second washer 30 includes a radially outer retention flange 34. A cage 40 is located between the first and second washers 20, 30, and includes a radially inner rim 42, a radially outer rim 44, and a plurality of segments 46 extending between the radially inner and outer rims 42, 44, as shown in detail in FIGS. 2-4. This arrangement of the cage 40 defines a plurality of rolling element pockets 48 that are adapted to receive rolling elements 60 in at least some of the pockets 48. In the exemplary embodiment, the rolling elements 60 are cylindrical rollers. However, they could be tapered rollers as well.

Figure 2:
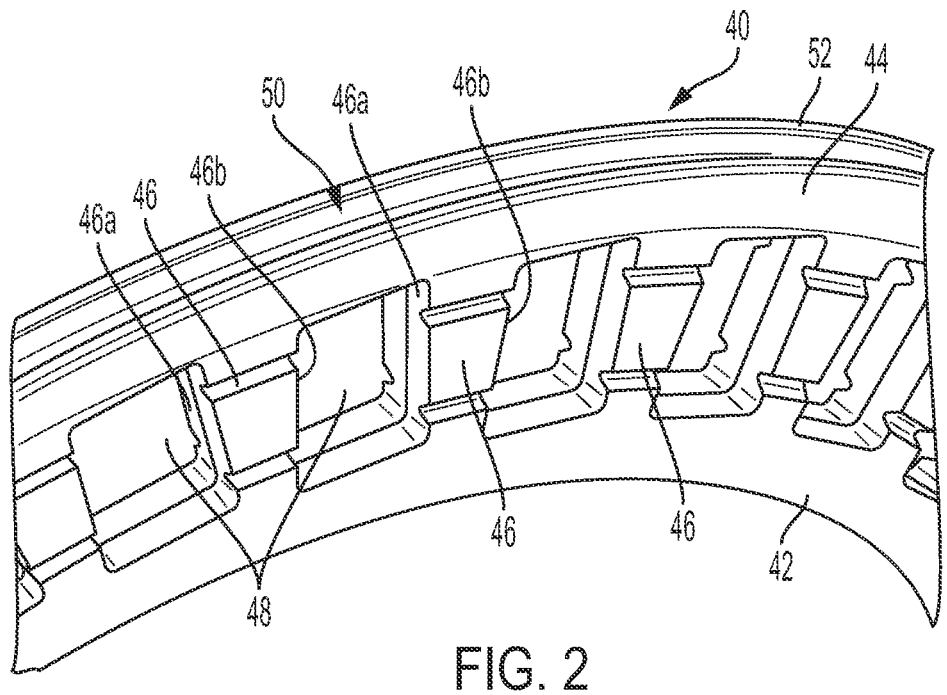
FIG. 2 is a partial perspective view of the bearing cage used in the bearing assembly of FIG. 1.
Figure 3:
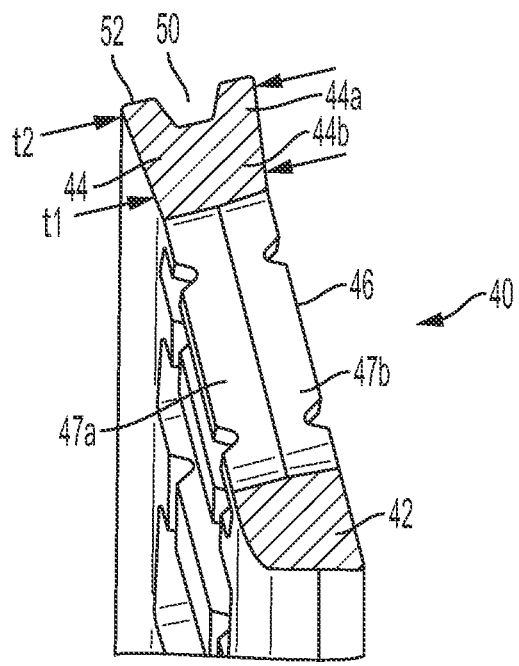
FIG. 3 is a cross-sectional view through a portion of the bearing cage shown in FIG. 1.
Figure 4:
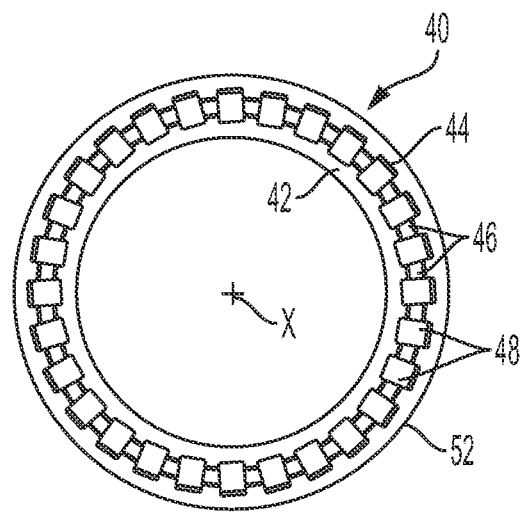
FIG. 4 is a side view of the bearing cage shown in FIGS. 1-3.

As shown in detail in FIGS. 1-3, a circumferentially extending groove is located on a radially outer surface 52 of the radially outer rim 44. Outer retention tabs 36 extend from the radially outer retention flange 34 into this circumferentially extending groove 50. These outer retention tabs 36 can be punched or bent inwardly from the material of the radially outer retention flange 34 of the second washer 30. The second washer 30, including the raceway 32, outer retention flange 34, and the outer retention tabs 36 can be integrally formed of stamped metal.

Still with reference to FIG. 1, in the retention tabs 26 are also formed on the radially inner flange 24 that extend to an opposite side of the cage 40 from the first raceway 22. These inner retention tabs 26 are preferably punched or formed from the radially inner retention flange 24. The first washer 20, including the first raceway 22, the inner retention flange 24, and the inner retention tabs 26 can be integrally formed of stamped metal.

The inner retention tabs 26 and the outer retention tabs 36 maintain the assembled bearing assembly 10 together.

As can be seen in FIGS. 1 and 3, in one arrangement, the outer rim 44 has a greater thickness t2 in cross-section at a radially outer region 44a than a thickness t1 in a radially inner region 44b. This can be formed by having the outer rim 44 with a tapered cross-sectional shape. The circumferentially extending groove is located in the radially outer region 44a and can also have a tapered shape, shown in detail in FIGS. 1 and 3. Here, it is preferred that a thickness of the side walls of the groove 50 are at least about 0.5 mm and can be 2 mm or more in order to provide the required stiffness for retaining the outer retention tabs 36 in the groove 50, while still being sufficiently flexible that the outer retention tabs 36 can be snapped over the wall of the groove 50.

The cage 40 is formed of a polymeric material, such as PA66. It can also be glass-filled to increase strength. Other suitable polymers may also be used. The first and second washers 20, 30 are preferably formed of bearing grade steel.

Using the present assembly, frictional losses and wear due to contact of the first and second washers 20, 30 at the inner diameter of the bearing assembly 10 due to radial slippage are avoided by providing an increased radial clearance space S between the radially inner edge 30a of the second washer 30 and the radially inner retention flange 24 of the first washer 20.

Additionally, in order to avoid friction losses between the outer retention tabs 36 and the walls of the groove 50, the shape of the groove 50 can also be tapered so that the potential for contact between the outer retention tabs 36 and the side walls of the groove 50 during use of the bearing assembly 10 is reduced.

As shown, the bearing assembly 10 may include the first raceway 22 and the second raceway 32 having a frustoconical form that extends at an angle θ to the axis X of the bearing assembly 10. The cage 40 may also be similarly frustoconically formed. This allows the bearing assembly 10 to carry some radial loads. Alternatively, the first raceway 22 and the second raceway 32 as well as the cage 40 may extend normal to the axis X of the bearing assembly 10 in order to transmit only axial loads.

As shown in detail in FIGS. 2 and 3, each of the segments 46 of the cage includes opposite sides 46a, 46b. Each of these opposite sides 46a, 46b face an adjacent one of the rolling element pockets 48. The sides 46a, 46b each include two surfaces 47a, 47b that intersect in a medial region of the pocket 48, and these two surfaces 47a, 47b are arranged at an angle of less than 180° relative to each other, for example 145°-170°. This provides a retaining feature for retaining the rolling element 60 in the pockets 48.

Figure 5:
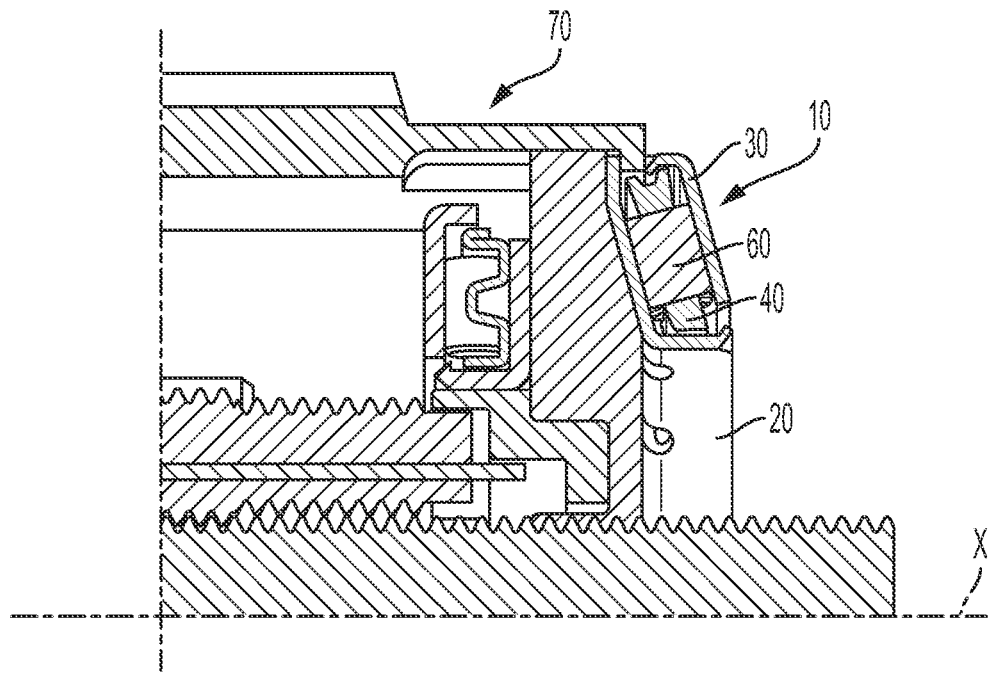
FIG. 5 is a partial cross-sectional view of a steering assembly incorporating the bearing assembly of FIG. 1.

Referring now to FIG. 5, the bearing assembly 10 is shown in one potential application in a steering mechanism 70 where both radial and axial loads are carried via the bearing assembly 10. The bearing assembly 10 provides for increased life while allowing for greater radial misalignment due to shifting of the rolling element 60 in the pockets 48 through the greater radial clearance space S while still avoiding contact between the first and second washers 20, 30.

In another aspect, a bearing cage 40 is provided separately and can be used for assembly in a bearing assembly 10 as discussed above. While the bearing cage 40 is shown having a frustoconical shape in FIGS. 1-3 with a cone angle θ, it could also extend normal to the axis X. The bearing cage 40 is as discussed above and is adapted to retain rolling element 60 in the pockets 48 formed between the radially inner rim 40 to the radially outer rim 44 and the plurality of segments 46.

Having thus described the present disclosure in detail, it is to be appreciated and will be apparent to those skilled in the art that many physical changes, only a few of which are exemplified in the detailed description of the exemplary embodiment, could be made without altering the concepts and principles embodied therein. It is also to be appreciated that numerous embodiments incorporating only part of the exemplary embodiment are possible which do not alter, with respect to those parts, the inventive concepts and principles embodied therein. The exemplary embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LIST OF REFERENCE NUMERALS 10 axial bearing assembly
20 first washer
22 first raceway
24 radially inner retention flange
26 inner retention tabs
30 second washer
32 second raceway
34 radially outer retention flange
36 outer retention tabs
40 cage
42 radially inner rim
44 radially outer rim
44a radially outer region
44b radially inner region
46 segments
46a,b opposite sides
47a,b surfaces
48 pockets
50 circumferentially extending groove
52 radially outer surface
60 rolling elements
70 steering mechanism
Θ angle
t1, t2 thicknesses
X axis

The invention claimed is:

1. An axial bearing assembly, comprising:
a first washer forming a first raceway and including a radially inner retention flange;
a second washer forming a second raceway axially spaced apart from the first raceway, the second washer including a radially outer retention flange;
a cage including a radially inner rim, a radially outer rim, and a plurality of segments extending between the radially inner and outer rims defining a plurality of rolling element pockets, the radially outer rim including a circumferentially extending groove on a radially outer surface, the circumferentially extending groove having a greater width in cross-section at a radially outer region than a width in a radially inner region;
rolling elements located in at least some of the pockets; and
outer retention tabs extending from the radially outer retention flange into the circumferentially extending groove.

2. The bearing assembly of claim 1, further comprising inner retention tabs formed on the radially inner retention flange that extend to an opposite side of the cage from the first raceway.

3. The bearing assembly of claim 1, wherein the first raceway, the second raceway, and the cage are frustoconical and extend at an acute angle to an axis of the bearing assembly.

4. The bearing assembly of claim 1, wherein the outer rim has a greater thickness in cross-section at a radially outer region than a thickness in a radially inner region.

5. The bearing assembly of claim 4, wherein the outer rim is tapered in cross-section.

6. The bearing assembly of claim 4, wherein the circumferentially extending groove is located in the radially outer region.

7. The bearing assembly of claim 1, wherein the cage is formed of a polymeric material.

8. The bearing assembly of claim 1, further comprising a radial clearance space between a radially inner edge of the second washer and the radially inner retention flange on the first washer.

9. The bearing assembly of claim 1, wherein each of the segments includes two opposite sides, each of the sides facing an adjacent one of the rolling element pockets, the sides each including two surfaces that intersect in a medial region of the pocket, and the two surfaces are arranged at an angle of less than 180° relative to each other.

10. The bearing assembly of claim 1, wherein the circumferentially extending groove is tapered in cross-section.

11. A bearing cage, comprising:
a radially inner rim;
a radially outer rim;
a plurality of segments extending between the radially inner and outer rims defining a plurality of rolling element pockets; and
the radially outer rim including a circumferentially extending groove on a radially outer surface that is configured to receive outer retention tabs extending from a radially outer retention flange of a radially extending raceway forming washer;
wherein the outer rim has a greater thickness in cross-section at a radially outer region than a thickness in a radially inner region.

12. The bearing cage of claim 11, wherein the outer rim is tapered in cross-section.

13. The bearing cage of claim 11, wherein the circumferentially extending groove is located in the radially outer region.

14. The bearing cage of claim 11, wherein the bearing cage is frustoconical.

15. The bearing cage of claim 11, wherein the bearing cage is formed of a polymeric material.

16. The bearing cage of claim 11, wherein each of the segments includes two opposite sides, each of the sides facing an adjacent one of the rolling element pockets, the sides each including two surfaces that intersect in a medial region of the pocket, and the two surfaces are arranged at an angle of less than 180° relative to each other.

17. A bearing cage, comprising:
a radially inner rim;
a radially outer rim;
a plurality of segments extending between the radially inner and outer rims defining a plurality of rolling element pockets; and
the radially outer rim including a circumferentially extending groove on a radially outer surface that is configured to receive outer retention tabs extending from a radially outer retention flange of a radially extending raceway forming washer;
wherein each of the segments includes two opposite sides, each of the sides facing an adjacent one of the rolling element pockets, the sides each including two surfaces that intersect in a medial region of the pocket, and the two surfaces are arranged at an angle of less than 180° relative to each other.

* * * * *